United States Patent [19]
Doluca

[11] Patent Number: 5,677,619
[45] Date of Patent: *Oct. 14, 1997

[54] METHOD AND APPARATUS FOR MULTIPLE OUTPUT REGULATION IN A STEP-DOWN SWITCHING REGULATOR

[75] Inventor: Tunc Doluca, Saratoga, Calif.

[73] Assignee: Maxim Integrated Products, Inc., Sunnyvale, Calif.

[*] Notice: The term of this patent shall not extend beyond the expiration date of Pat. No. 5,532,577.

[21] Appl. No.: 673,126

[22] Filed: Jul. 1, 1996

Related U.S. Application Data

[63] Continuation of Ser. No. 222,461, Apr. 1, 1994, Pat. No. 5,532,577.

[51] Int. Cl.[6] .................................................. G05F 1/56
[52] U.S. Cl. ............................................ 323/282; 323/267
[58] Field of Search ...................................... 323/222, 267, 323/266, 282, 284, 285, 290, 351

[56] References Cited

U.S. PATENT DOCUMENTS

| | | | |
|---|---|---|---|
| 4,454,558 | 6/1984 | Huddart | 323/266 |
| 4,881,023 | 11/1989 | Perusse et al. | 323/266 |
| 5,019,770 | 5/1991 | Harada et al. | 323/282 |
| 5,070,294 | 12/1991 | Nochi | 323/267 |
| 5,257,170 | 10/1993 | Spruijt | 363/16 |
| 5,386,359 | 1/1995 | Nochi | 323/282 X |
| 5,397,976 | 3/1995 | Madden et al. | 323/222 |
| 5,418,704 | 5/1995 | Hua et al. | 323/282 X |
| 5,422,562 | 6/1995 | Mammano et al. | 323/282 |
| 5,532,577 | 7/1996 | Doluca | 323/282 |

*Primary Examiner*—Adolf Berhane
*Attorney, Agent, or Firm*—Blakely, Sokoloff, Taylor & Zafman LLP

[57] ABSTRACT

A step-down switching regulator of the present invention includes (1) a magnetic storage device having at least one primary output and one secondary output, (2) a current sensing device for detecting current through a primary winding of the magnetic storage device, (3) a first switch, (4) a second switch, (5) a first comparator for detecting whether the current through the primary winding is greater than a limit value, (6) a second comparator for detecting loss of regulation in the secondary output, and (7) a switch logic circuitry for allowing only one of the first switch or the second switch to turn on at a time. When the primary output is out of regulation, the first switch turns on to deliver power to the primary output. When the secondary output is out of regulation, one of two methods can be used to supply power to the secondary output. A first method turns on the first switch for a short time, and then the second switch turns on to deliver power to the secondary output. A second method turns on the second switch without first turning on the first switch. In either methods, the second switch can be turned off at the end of a pre-determined time period, at the end of a clock cycle, when the current through the primary winding exceeds a pre-determined limit value, or when the current through the primary winding is substantially zero.

10 Claims, 8 Drawing Sheets

METHOD AND APPARATUS FOR MULTIPLE OUTPUT REGULATION IN A STEP-DOWN SWITCHING REGULATOR

This is a Continuation Application of application Ser. No. 08/222,461, filed Apr. 01, 1994 now U.S. Pat. No. 5,532,577.

BACKGROUND OF THE INVENTION

1. Field of the Invention

The present invention relates to the field of power supplies and, more particularly, to step-down DC—DC converters or step-down switching regulators wherein controlling the primary and secondary output voltages is desired.

2. Description of the Related Art

FIG. 1A shows a prior art step-down switching regulator 5 with a primary winding 6. Step-down switching regulator 5 includes primary winding 6, a capacitor 9 and two input switches $S_A$ 3 and $S_B$ 4 controlled by input signals D 7 and $\overline{D}$ 19, respectively. It should be noted that the signal $\overline{D}$ is a logical inversion of the signal D, according to the conventional signal naming provision. A step-down switching regulator such as the one shown in FIG. 1A is commonly used to convert a DC unregulated input voltage, $V_{IN}$ 2, to a regulated DC output voltage, $V_{OUT}$ 8. In this configuration, $V_{OUT}$ 8 is less than $V_{IN}$ 2, and hence, the name step-down is used. Switches $S_A$ 3 and $S_B$ 4 of step-down switching regulator 5 are used to alternatively connect the first side (23) of primary winding 6 to either $V_{IN}$ 2 or ground. The second side (25) of primary winding 6 is connected to $V_{OUT}$ 8. The regulation of $V_{OUT}$ 8 is achieved by controlling the duty cycle of the input switches—$S_A$ 3 and $S_B$ 4.

In most applications, $S_B$ 4 has been a rectifier rather than a switch. However, recent demand for higher conversion efficiencies and lower output voltages has forced the use of switches, also called as synchronous rectifiers, for $S_B$ 4.

Now referring to FIG. 1B, because many applications require more than one output voltage, a step-down switching regulator 25 is provided with a secondary winding 16 magnetically coupled to a primary winding 15. It should be noted that more windings can be added to generate more output voltages. A secondary output voltage, $V_{SEC}$ 20, developed across secondary winding 16 can be regulated because the voltage, $V_{PRI}$ 15, across primary winding 15 is known when $S_B$ 11 is on. As shown in FIG. 1C, $V_{SEC}$ 20 is equal to $-W^*V_{OUT}$ when $S_A$ 10 is off and $S_B$ 11 is on, where W is the ratio determined by dividing the number of turns in secondary winding 16 by the number of turns in primary winding 15. The coupling direction is chosen such that $V_{SEC}$ 20 is the turns ratio W times $V_{PRI}$.

Now referring to FIGS. 1B and 1C, Since (i) an input signal D 13 and an input signal $\overline{D}$ 14 are complementary, (ii) D controls $S_A$ 10, and (iii) $\overline{D}$ 14 controls $S_B$ 11, when $S_A$ 10 is on, $S_B$ 11 is off. $V_{LX}$ 21 is equal to $V_{IN}$ when $S_A$ 10 is on, and $V_{LX}$ 21 becomes zero when $S_B$ 11 is on. $V_{PRI}$ 22 stays at the voltage level of $V_{IN}-V_{OUT}$ when $S_A$ 10 is on, and $V_{PRI}$ 22 becomes $-V_{OUT}$ when primary winding 15 is connected to ground through $S_B$ 11. Because of the coupling direction, $V_{SEC}$ 20 is $W^*V_{PRI}$. Thus, when $V_{PRI}$ 22 is $V_{IN}-V_{OUT}$, $V_{SEC}$ 20 becomes $W^*(V_{IN}-V_{OUT})$, and when $V_{PRI}$ 22 is $-V_{OUT}$, $V_{SEC}$ 20 is $-W^*V_{OUT}$.

A DC output voltage can be obtained by rectifying and filtering $V_{SEC}$ 20. FIGS. 2A–2D show various ways of connecting the output(s) of the secondary winding(s) to generate output voltages that are: (i) positive, (ii) positive above $V_{OUT}$, (iii) negative and (iv) negative and positive.

FIG. 2A shows a prior art step-down switching regulator for generating a positive secondary output voltage. The positive side of a secondary winding 31 is coupled to a rectifier 32 and to an output voltage $V_A$ 30 to produce a positive output voltage at $V_A$ 30. The negative side of secondary winding 31 is connected to ground. The output voltage $V_A$ 30 is equal to the voltage $V_S$ across secondary winding 31 subtracted by $V_D$ across rectifier 32, or $V_A=V_S-V_D$. When $S_B$ 35 is on, the voltage $V_P$ across a primary winding 33 is $-V_{OUT}$. Since $V_S$ is $M/N^*(-V_P)$, where M is the number of turns in secondary winding 31, and N is the number of turns in primary winding 33, $V_S$ is $M/N^*V_{OUT}$. Thus, $V_A$ 30 becomes $M/N^*V_{OUT}-V_D$. Accordingly, the step-down switching regulator in FIG. 2A produces a positive output voltage.

Now referring to FIG. 2B, a prior art step-down switching regulator for generating a positive secondary output voltage above the output voltage of a primary winding is shown. The negative side of a secondary winding 41 is connected to $V_{OUT}$ 44, while the positive side of secondary winding 41 is coupled to a rectifier 42 and to an output voltage $V_A$ 40 to generate a positive voltage above $V_{OUT}$ at $V_A$ 40. In FIG. 2B, the output voltage $V_A$ 40 is equal to the sum of the voltage $V_S$ across secondary winding 41 and $V_{OUT}$ 44 subtracted by $V_D$ across rectifier 42, or $V_A=V_S+V_{OUT}-V_D$. Since $V_S$ is $M/N^*V_{OUT}$, $V_A$ 40 becomes $M/N^*V_{OUT}+V_{OUT}-V_D$, or $V_A=(M/N+1)^*V_{OUT}-V_D$. $V_A$ 40 is equivalent to the sum of $V_A$ 30 and $V_{OUT}$ 34. Accordingly, the step-down switching regulator in FIG. 2B produces a positive output voltage above $V_{OUT}$ 44.

FIG. 2C presents a prior art step-down switching regulator for generating a negative secondary output voltage. While the elements are connected in a similar manner as the ones in FIG. 2B, the coupling direction of a secondary winding 51 is reversed, and the direction of a rectifier 52 is reversed. In this example, a secondary output voltage $V_A$ 50 becomes the sum of the voltage $V_S$ across secondary winding 51 and the voltage $V_D$ across rectifier 52, or $V_A=V_S+V_D$. Since $V_S$ is $-M/N^*V_{OUT}$, $V_A$ 40 becomes $-(M/N^*V_{OUT}-V_D)$. Thus, the step-down switching regulator in FIG. 2C produces a negative output voltage.

FIG. 2D is a prior art step-down switching regulator for generating a positive and negative secondary output voltages. The step-down switching regulator in FIG. 2D incorporates two secondary windings 61 and 71, each having M turns and L turns, respectively. Secondary winding 61 is connected in the same way as secondary winding 51 is FIG. 2C. However, while secondary winding 51 is coupled to $V_A$ 50 in FIG. 2C, secondary winding 61 is coupled to an output voltage $V_A$ 60 in FIG. 2D. Secondary winding 71 is connected in the same way as secondary winding 31 in FIG. 2A. Secondary winding 71 is coupled to $V_B$ 70 as secondary winding 31 is coupled to $V_A$ 30 in FIG. 2A. Therefore, $V_A$ 60, like $V_A$ 50, becomes $-(M/N^*V_{OUT}-V_D)$. Likewise, $V_B$ 70, like $V_A$ 30, becomes $M/N^*V_{OUT}-V_D$. Accordingly, the step-down switching regulator in FIG. 2D produces both a negative output voltage and a positive output voltage.

A step-down converter is the most efficient converter topology. However, the efficiency factor can be degraded by various loss mechanisms listed below from the highest to the lowest loss:

1. Switch and inductor resistive losses;
2. Transformer core losses;
3. Switching losses;
4. Controller element quiescent power.

Under medium to heavy load currents, loss mechanisms 1 and 2 dominate. However, at light load currents, loss mechanisms 1 and 2 are relatively low compared to loss mechanisms 3 and 4. Modern converters, therefore, reduce the switching frequency at light loads to minimize losses due to loss mechanism 3, and thereby improve light load efficiency.

Now referring again to FIG. 1B, the efficiency improvement at light load currents is typically achieved by skipping switching cycles of $S_A$ 10 and $S_B$ 11 entirely and delivering a predetermined amount of energy to a load during a cycle. Switch $S_A$ 10 is turned on for a predetermined amount of time, or until a packet of energy is delivered to the load. A control circuit (not shown) that controls $S_A$ 10 and $S_B$ 11 then goes into a low current mode, disables switching of $S_A$ 10 and $S_B$ 11 until $V_{OUT}$ 17 drops to a level that causes this process to be repeated. The process starts again by turning on $S_A$ 10.

Continuing to refer to FIG. 1B, this scheme has a drawback when multiple winding topology is incorporated. The control circuit can only regulate one of the outputs—the primary output coupled to primary winding 15 or the secondary output coupled to secondary winding 16—usually chosen to be the primary output. When the regulated primary output is lightly loaded, or not loaded at all, a feedback loop that couples the primary output to the control circuit turns on the high side switch such as $S_A$ 10 in FIG. 1B infrequently to preserve efficiency. This results in no power being delivered to the secondary output. If the secondary output is connected to a heavy load, the secondary output voltage collapses and cannot be regulated.

Another simple way to control a secondary output voltage in a step-down switching regulator may be alternatively pulsing switches such as $S_A$ 10 and $S_B$ 11 in FIG. 1B constantly so that energy is always delivered to the secondary output, rather than providing a feedback loop between the secondary output and a control circuitry. This scheme may seem effective, but has very low efficiency at light primary loads as indicated above.

SUMMARY OF THE INVENTION

The present invention provides methods and apparatus for regulating one or more secondary output voltages and the primary output voltage in a step-down switching regulator without compromising light load efficiency and for regulating the secondary output voltages regardless of the load on the primary output.

A step-down switching regulator of the present invention includes (1) a magnetic storage device having at least one primary winding, one primary output and one secondary output, (2) a current sensing device for detecting a current through the primary winding of the magnetic storage device, (3) a first switching device for connecting the primary winding to an input voltage, (4) a second switching device for connecting the primary winding to ground, (5) a first comparator for detecting whether the current through the primary winding is greater than a limit value, (6) a second comparator for detecting loss of regulation in the secondary output, and (7) a switch logic circuitry for allowing only one of the first switching device or the second switching device to turn on at a time.

When the primary output is out of regulation, the first switching device turns on to deliver power to the primary output. When the secondary output is out of regulation, one of two methods can be used to supply power to the secondary output. A first method turns on the first switching device for a short time, and then the second switching device turns on to deliver power to the secondary output. A second method turns on the second switching device without first turning on the first switching device. In either methods, the second switching device can be turned off (1) at the end of a pre-determined time period, (2) at the end of a clock cycle, (3) when the current through the primary winding exceeds a pre-determined limit value or (4) when the current through the primary winding is substantially zero.

BRIEF DESCRIPTION OF THE DRAWINGS

FIG. 6C is a timing diagram showing an operation where a primary output is loaded, and a switch $S_A$ is pulsed on.

DETAILED DESCRIPTION OF THE INVENTION

The present invention provides methods and apparatus for regulating one or more secondary output voltages even in the absence of a load to the primary output.

Figure 1A:
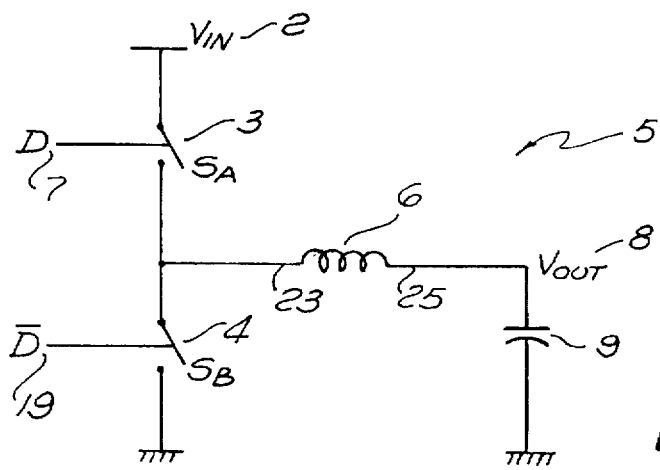
FIG. 1A is a prior art step-down switching regulator having a primary winding.
Figure 1B:
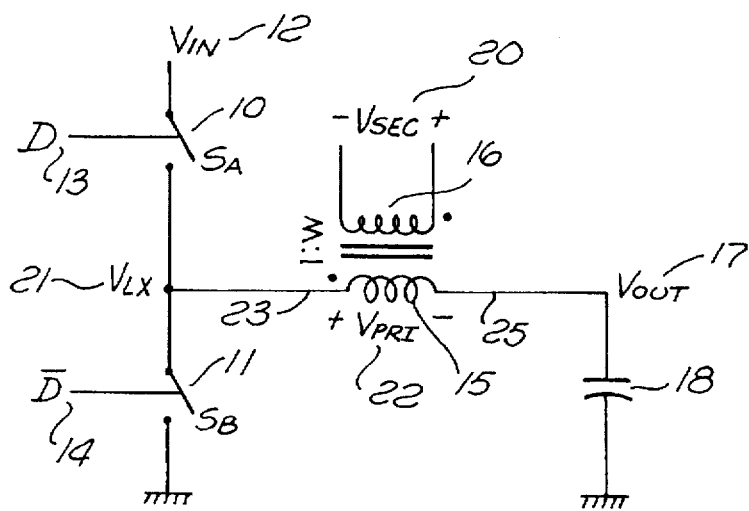
FIG. 1B is a prior art step-down switching regulator having a primary and secondary windings.
Figure 1C:
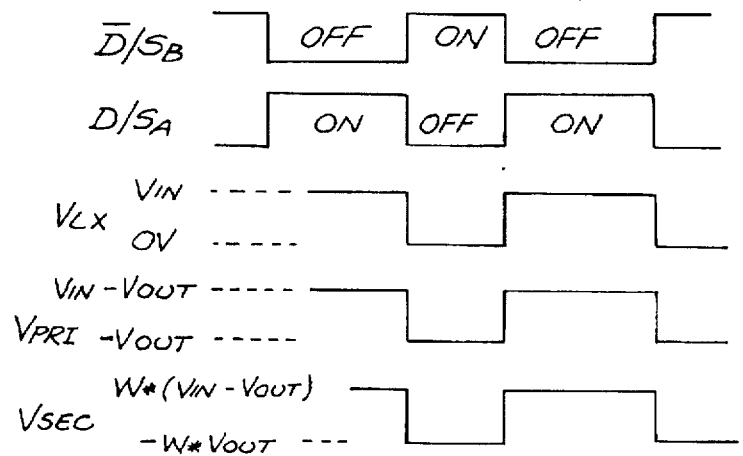
FIG. 1C is a timing diagram for the prior art in FIG. 1B showing voltages at various nodes.
Figure 2A:
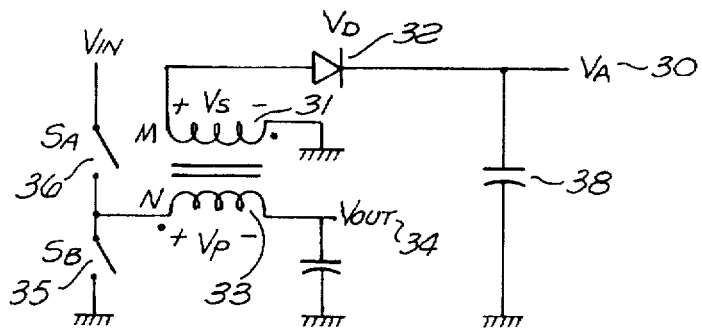
FIG. 2A is a prior art step-down switching regulator for generating a positive secondary output voltage.
Figure 2B:
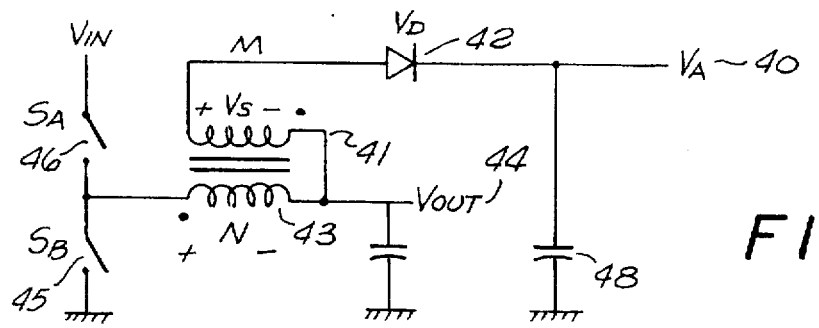
FIG. 2B is a prior art step-down switching regulator for generating a positive secondary output voltage above the output voltage of a primary winding.
Figure 2C:
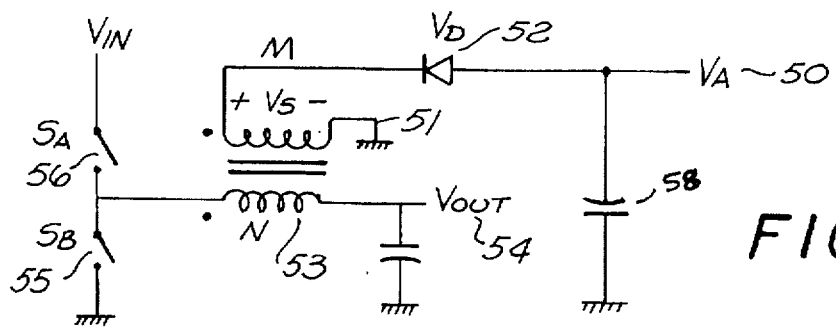
FIG. 2C is a prior art step-down switching regulator for generating a negative secondary output voltage.
Figure 2D:
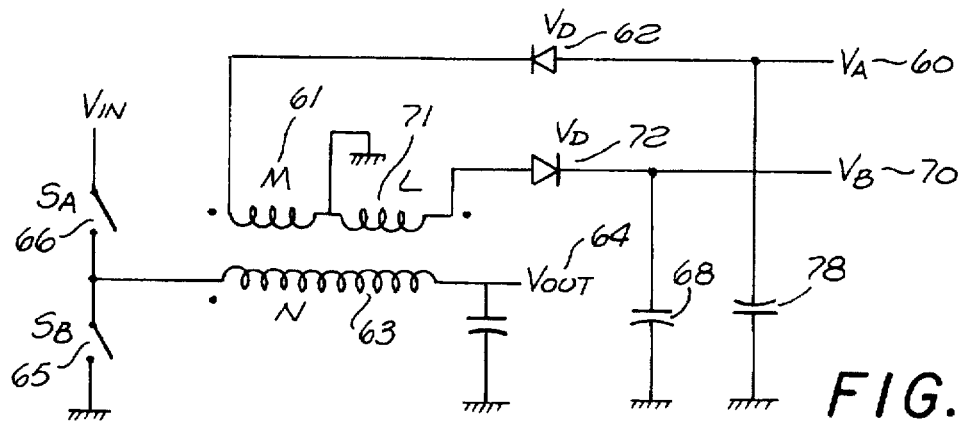
FIG. 2D is a prior art step-down switching regulator for generating a positive and negative secondary output voltages.
Figure 3A:
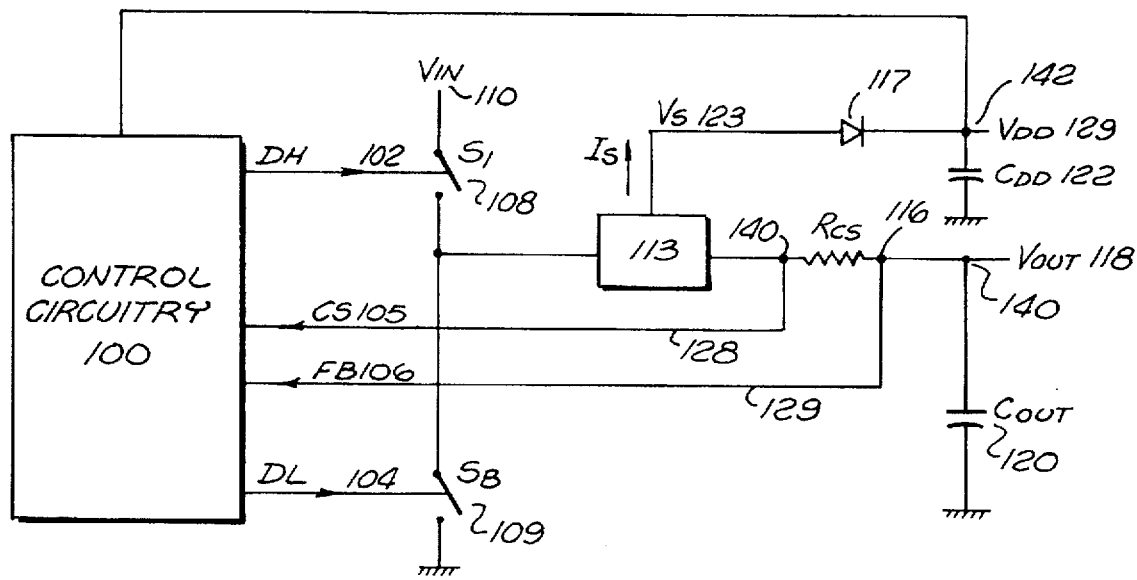
FIG. 3A is a step-down switching regulator having a control circuitry and having both a primary feedback loop and a secondary feedback loop according to the present invention.
Figure 7:
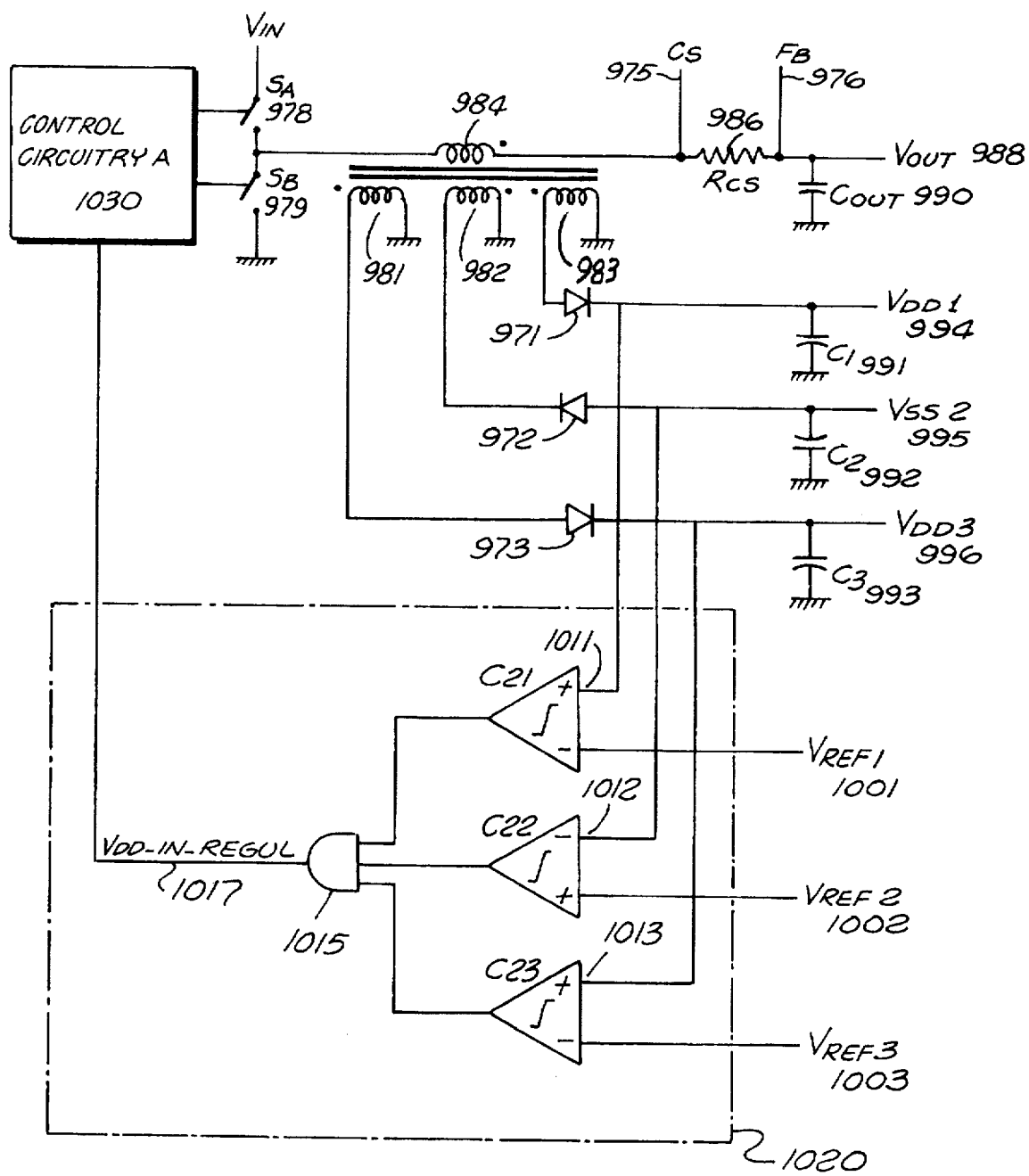
FIG. 7 is a step-down switching regulator with multiple secondary outputs.

The present invention provides a secondary feedback loop to control a secondary output voltage or multiple secondary output voltages in a step-down switching regulator and to minimize the drawbacks discussed above. FIG. 3A shows a step-down switching regulator 101 having a control circuitry 100 that is coupled to a primary output node 140 through a primary feedback loop comprised of 128 and 129, and to a secondary output node 142 through a secondary feedback loop 126. Although FIG. 3A shows one secondary output, multiple secondary outputs may be incorporated as shown in FIG. 7, in which case a control circuitry is coupled to each of the multiple secondary outputs. Step-down switching regulator 101 further includes (i) two switches $S_A$ 108 and $S_B$ 109, (ii) a magnetic storage device 113 that may be a inductor or a transformer, (iii) a rectifier 117, which can be a synchronous switch that turns on when $S_B$ 109 is on, (iv) an inductor current sense resister Rcs 116 and (v) two charge storage devices $C_{OUT}$ 120 and $C_{DD}$ 122.

Figure 3B:
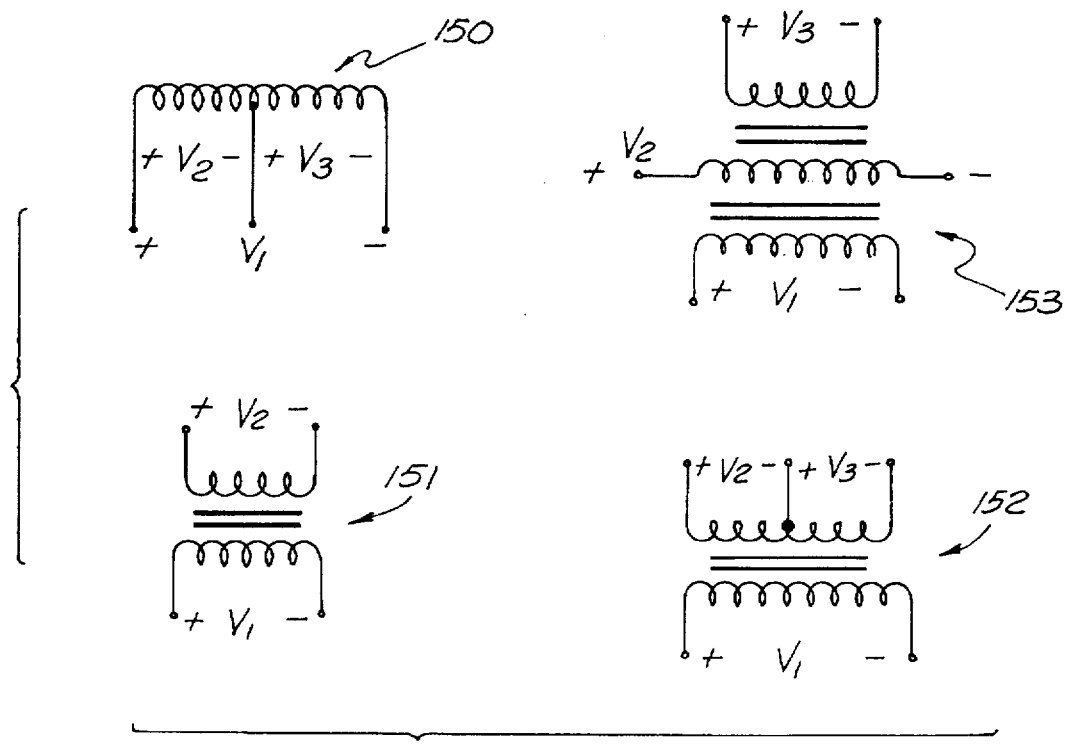
FIG. 3B presents examples of magnetic storage devices that can be incorporated in the present invention.

FIG. 3B shows some examples of magnetic storage devices that may be incorporated in a step-down switching regulator including a coupled inductor 150, a two-winding transformer 151, a three-winding transformer 152 and another three-winding transformer 153. These examples are shown for illustration purpose only and should not be taken as limiting the scope of the invention.

Figure 3C:
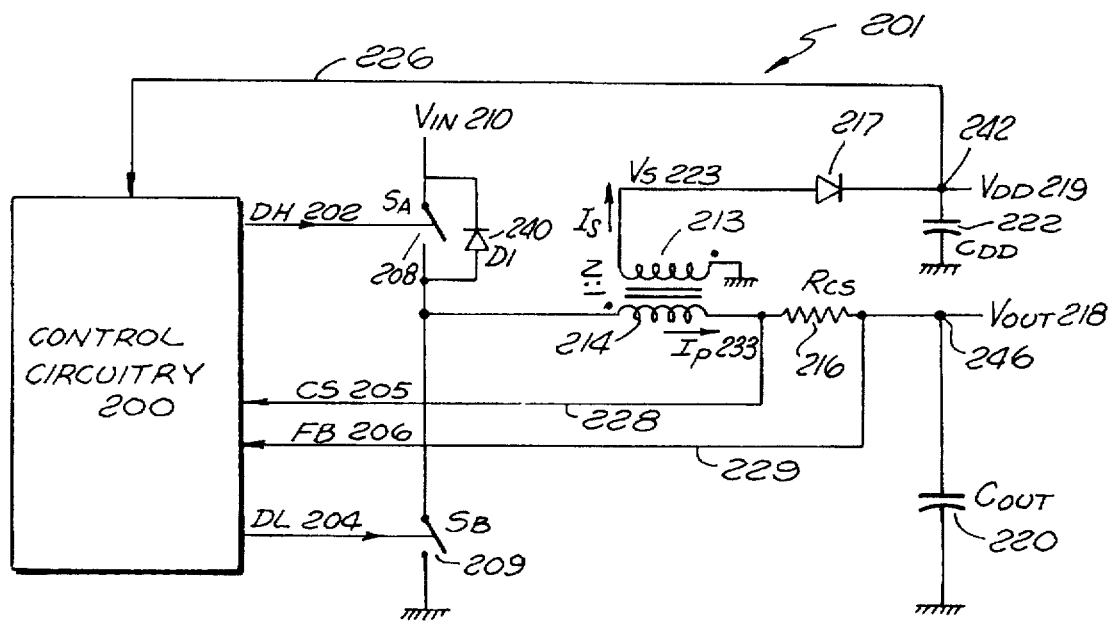
FIG. 3C presents a step-down switching regulator with a two-winding transformer according to the present invention.

FIG. 3C presents a step-down switching regulator 201 according to the present invention with a two-winding transformer having a primary winding 214 and a secondary winding 213 and having a turns ratio of N.

Figure 3D:
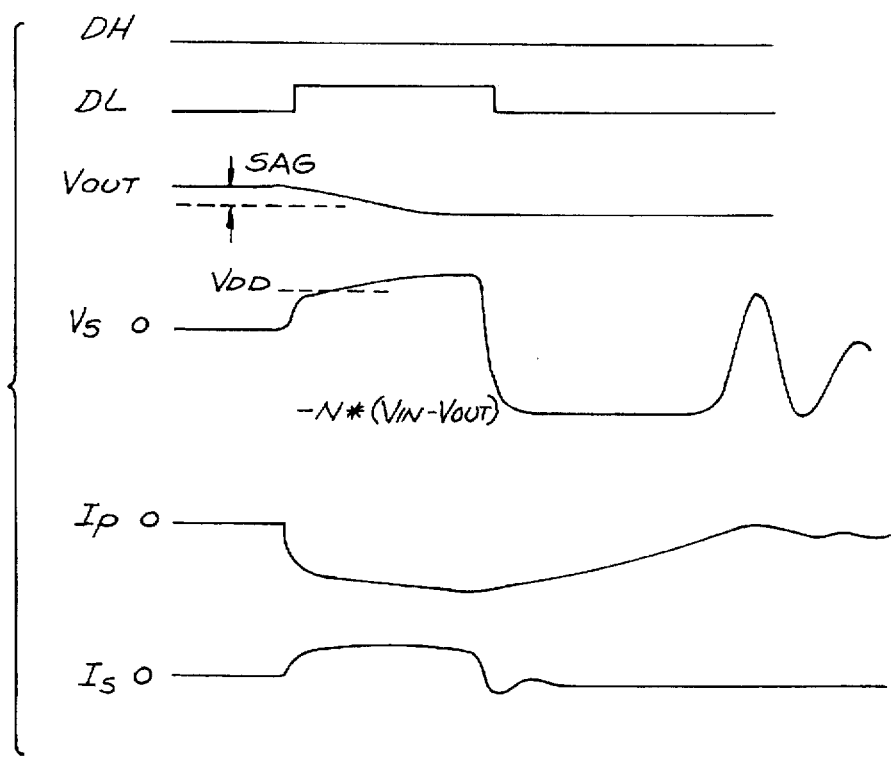
FIG. 3D presents current and voltage waveforms of the step-down switching regulator in FIG. 3C.

FIG. 3D shows typical current and voltage waveforms of step-down switching regulator 201 in FIG. 3D when $S_B$ 209 is pulsed for a fixed duration t0. Referring to FIGS. 3C and 3D, when DH 202 is high, $S_A$ 208 is on, and when DL 204 is high, $S_B$ 209 is on. When $S_B$ 209 is turned on, the voltage $V_{OUT}$ 218 is applied to primary winding 214. This causes the voltage $N*V_{OUT}$ to be developed across secondary winding 213, forcing current through primary winding 214 and secondary winding 213, and delivering power from a filter capacitor $C_{OUT}$ 220 to a secondary output node 242. The small output voltage sag at $V_{OUT}$ 218 in FIG. 3D would eventually be detected by a primary feedback loop of 228 and 229 coupled to a control circuitry 200 which would replenish the lost energy by turning on $S_A$ 208. When $S_B$ 209 is turned off, the voltage across primary winding 214 becomes $V_{IN}-V_{OUT}$ because of a diode D1 240, and $V_S$ becomes $-N*(V_{IN}-V_{OUT})$ for a short period of time. Switches $S_A$ 208 and $S_B$ 209 may be a device including but not limited to a MOSFET or a bipolar transistor. If $S_A$ 208 is an N-channel MOSFET, D1 240 is an inherent diode formed between the substrate and the drain of $S_A$ 208 when the substrate is tied to the source. On the other hand, if $S_A$ 208 is a bipolar transistor, D1 240 is a separate device external to the bipolar transistor.

Continuing to refer to FIGS. 3C and 3D, an inductor current sense resistor $R_{CS}$ 216 is normally used to measure and control a primary output current Ip 233 under fault conditions as well as for other control mechanisms such as current mode control. In addition, $R_{CS}$ 216 is used to prevent excess energy being transferred from $C_{OUT}$ 220 to $C_{DD}$ 222. When current $I_p$ 233 exceeds a preset limit, switch $S_B$ 209 is turned off. Moreover, when $I_p$ 233 is substantially close to zero, switch $S_B$ 209 is turned off to enhance light load efficiency. On the other hand, when $I_p$ 233 is substantially close to zero, switch $S_B$ 209 may be kept on to deliver extra power to secondary output node 242.

According to the present invention, two different methods and apparatus may be utilized for controlling the secondary output voltage(s). These methods and apparatus will be described in reference to FIG. 3C. First, when control circuitry 200 detects loss of regulation in a secondary output voltage $V_{DD}$ 219 through a secondary feedback loop 226, control circuitry 200 initiates a switching cycle by first turning on $S_A$ 208 and then $S_B$ 209. This process delivers current to secondary output node 242. This scheme is effective in controlling the secondary output voltage, but may suffer from output over-shoot since when there is no load on primary winding 214, output voltage $V_{OUT}$ 218 tends to be at its maximum. This scheme is described below in more detail.

Figure 4A:
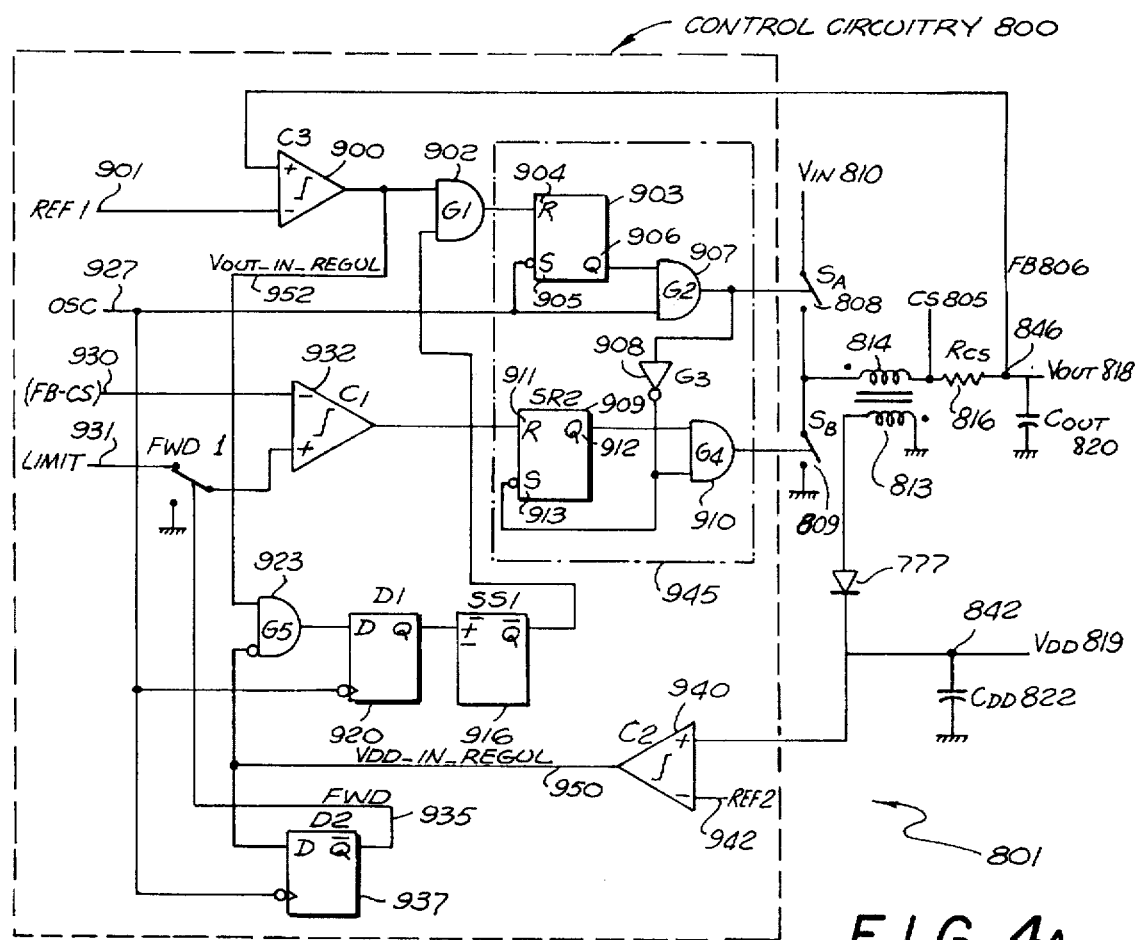
FIG. 4A is a step-down switching regulator showing a control circuitry according to the first method of the present invention.

FIG. 4A is a step-down switching regulator 801 according to the first scheme of the present invention. Step-down switching regulator 801 includes a control circuitry 800 having (i) three comparators C1 932, C2 940 and C3 900, (ii) a switch logic circuitry 945 including SR1 903, SR2 909, G2 907, G3 908 and G4 910, (iii) two flip-flops D1 920 and D2 937, (iv) a single shot switch SS1 916 and (v) two AND gates G1 902 and G5 923. It should be noted that inverter G3 908 is used to ensure that $S_A$ 808 and $S_B$ 809 are not turned on at the same time.

Step-down switching regulator 801 further includes (i) a primary winding 814, the first side of which is coupled to either switch $S_A$ 808 or $S_B$ 809, (ii) a secondary winding 813, the first side of which is coupled to ground, (iii) an inductor current sense resister $R_{CS}$ 816 coupled to the second side of primary winding 814 and to comparator C3 900, (iv) a storage device $C_{OUT}$ 820 coupled to $R_{CS}$ 816 and to $V_{OUT}$ 818, (v) a rectifier 777 coupled to the second side of secondary winding 813 and to comparator C2 940, and (vi) a storage device $C_{DD}$ 822 coupled to rectifier 777, to a secondary output voltage $V_{DD}$ 819 and to C2 940. Although a diode like D1 240 in FIG. 3C is not shown in FIG. 4A, it can be incorporated here as well.

Figure 4B:
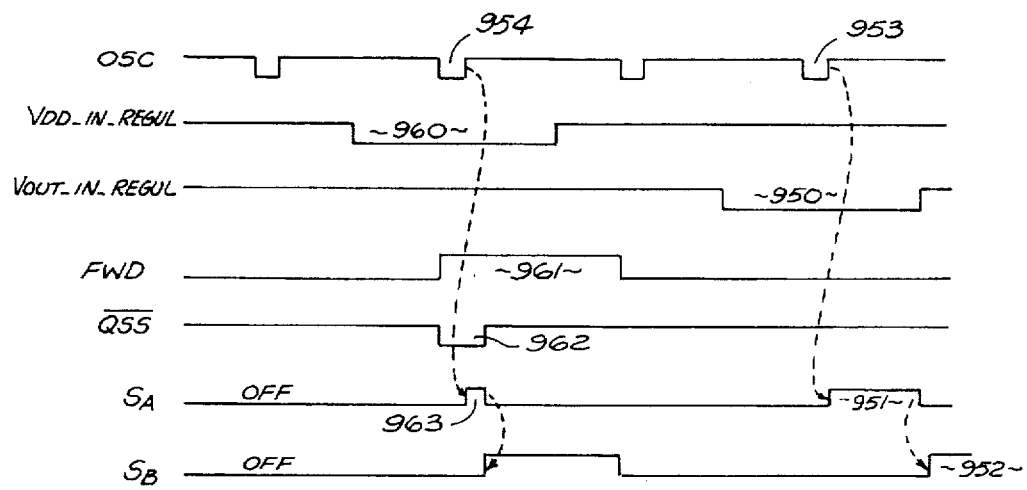
FIG. 4B is a timing diagram of the step-down switching regulator in FIG. 4A.

FIG. 4B is a timing diagram of step-down switching regulator 801 in FIG. 4A showing how primary output voltage $V_{OUT}$ 818 and secondary output voltage $V_{DD}$ 819 are regulated according to the first scheme of the present invention.

Now referring to FIGS. 4A and 4B, comparator C3 900 detects whether primary output voltage $V_{OUT}$ 818 is in regulation and generates a VOUT_IN_REGUL signal 952. VOUT_IN_REGUL 952 is HIGH when $V_{OUT}$ 818 is in regulation, and VOUT_IN_REGUL 952 is LOW when $V_{OUT}$ 818 is out of regulation. When VOUT_IN_REGUL 952 is HIGH and the output of SS1 916 is HIGH, a reset R 904 of SR1 903 is HIGH, causing the output of SR1 903 to go LOW, and thus, turning off $S_A$ 808. When $V_{OUT}$ 818 falls out of regulation ($V_{OUT}$ 818 is less than REF1 901), VOUT_IN_REGUL 952 becomes LOW, shown as 950 in FIG. 4B, R 904 become LOW, and $S_A$ 808 turns on at the rising edge of OSC 927 and stays on (shown as a region 951) until VOUT_IN_REGUL 952 becomes HIGH again. When $S_A$ 808 turns off, $S_B$ 809 turns on (shown as a region 952) to deliver power to a secondary output node 842.

Comparator C2 940 detects whether secondary output voltage $V_{DD}$ 819 is in regulation by monitoring whether $V_{DD}$ 819 is above a preset reference level (REF2) 942. When $V_{DD}$ 819 falls out of regulation, shown as a region 960 in FIG. 4B, a VDD-IN-REGUL signal 950 is clocked into flip-flops D1 920 and D2 937. At the falling edge of OSC 927, a FWD signal 935 turns on (shown as a region 961), and SS1 916 generates a LOW pulse for a short duration, causing the output of G1 902 to go LOW. This allows $S_A$ 808 to turn on at the rising edge of OSC 927. $S_A$ 808 stays on (shown as a region 963) until the short LOW pulse times out. When the short LOW pulse of SS1 916 times out, G1 902 resets SR1 903 and turns off $S_A$ 808. This causes the synchronous switch SR2 909 to latch and turn on $S_B$ 809, delivering power to secondary output node 842. While FWD 935 is HIGH, the positive side of C1 932 is connected to a LIMIT signal 931, and the voltage signal of(FB-CS) 930 is compared to LIMIT 931. C1 932 outputs HIGH and causes $S_B$ 809 to turn on as long as (FB-CS) 930 is less than LIMIT 931. $S_B$ 809 is turned off (1) at the end of a predetermined time period, (2) at the end of a clock cycle, (3) when the current through primary winding 813 exceeds a predetermined limit value or (4) when the current through primary winding 813 is substantially zero.

A second scheme of the present invention, an improvement over the first scheme, is described below. Referring to FIG. 3C, when control circuitry 200 detects loss of regulation in secondary output voltage $V_{DD}$ 219 through secondary feedback loop 226, control circuitry 200 turns on $S_B$ 209 for a fixed amount of time, and power is delivered from a primary output node 246 to secondary output node 242. As a consequence of energy loss from primary output node 246, primary feedback loop 228 and 229 will cause control circuitry 200 to initiate a switching cycle by turning on $S_A$ 208 first and then $S_B$ 209. This scheme is implemented in the preferred embodiment of the present invention, as shown in FIG. 5.

Figure 5:
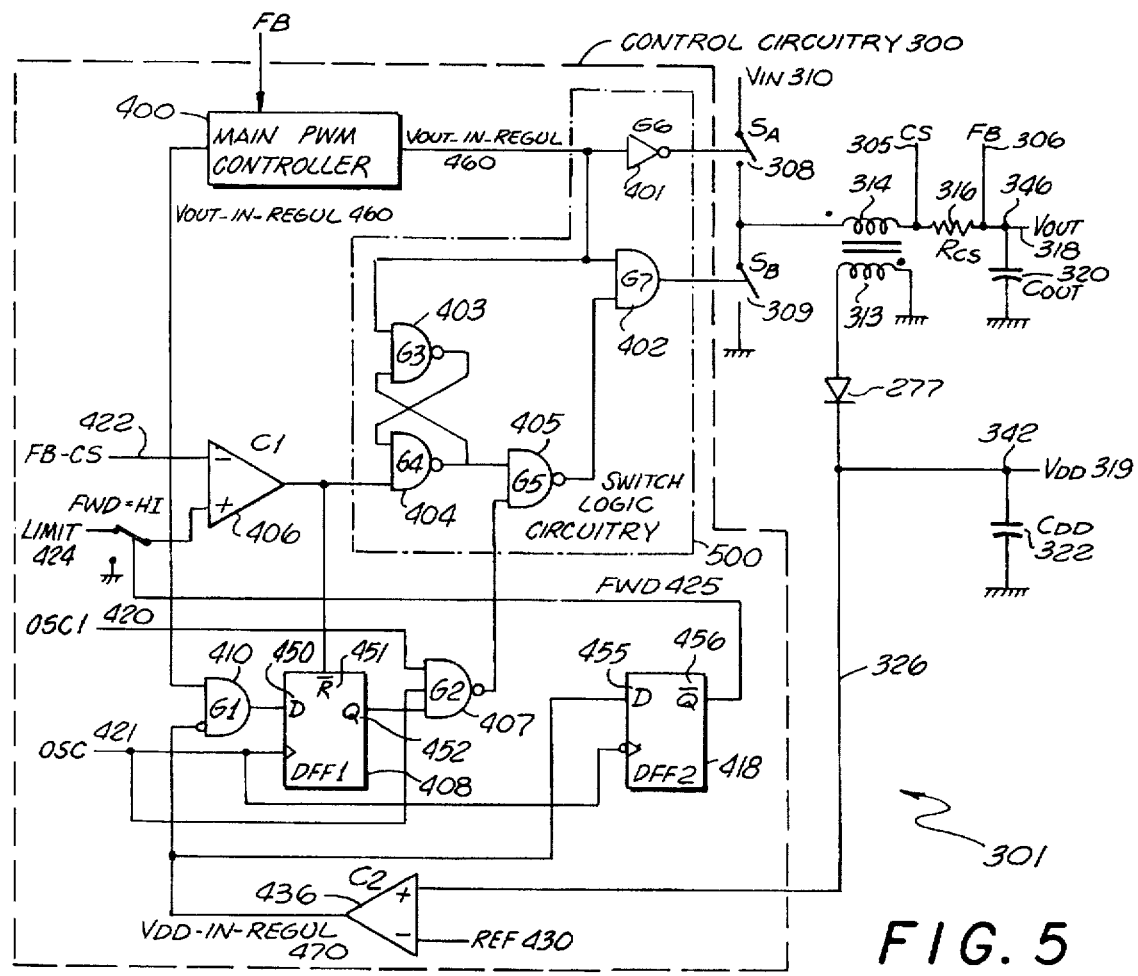
FIG. 5 is a step-down switching regulator showing a control circuitry according to the second method of the present invention.

Now referring to FIG. 5, a step-down switching regulator 301 shows a control circuitry 300 in detail according to the present invention. Control circuitry 300 has (i) a main Pulse-Width-Modulated (PWM) controller 400, (ii) a switch logic circuitry 500 including gates G3 403, G4 404, G5 405, G6 401 and G7 402, (iii) two comparators C1 406 and C2 436, (iv) two flip-flops DFF1 408 and DFF2 418 and (v) two gates—one AND gate G1 410 and one NAND gate G2 407. Step-down switching regulator 301 includes, in addition to control circuitry 300, (i) a primary winding 314, the first side of which is coupled to either $S_A$ 308 or $S_B$ 309, (ii) a secondary winding 313, the first side of which is coupled to ground, (iii) an inductor current sense resister $R_{CS}$ 316 coupled to the second side of primary winding 314 and to control circuitry 300 through CS 305 and FB 306, (iv) a storage device $C_{OUT}$ 320 coupled to $R_{CS}$ 316 and to $V_{OUT}$ 318, (v) a rectifier 277 coupled to the second side of secondary winding 313 and to comparator C2 436 and (vi) a storage device $C_{DD}$ 322 coupled to rectifier 277, to a secondary output voltage $V_{DD}$ 319 and to C2 436.

Continuing to refer to FIG. 5, comparator C2 436 detects whether secondary output voltage $V_{DD}$ 319 is in regulation by monitoring whether $V_{DD}$ 319 is above a preset reference level (REF) 430. Gate G1 410 ensures that energy is delivered to a secondary output node 342 only if primary output voltage $V_{OUT}$ 318 is in regulation or, in other words, a signal VOUT_IN_REGUL 460 is HIGH. Flip-flop DFF1 408 is used to synchronize the inverted signal of VDD_IN_REGUL 470 and VOUT_IN_REGUL 460 to an oscillator (OSC) 421, and to latch the output value of G1 410.

Continuing to refer to FIG. 5, Flip-flop DFF2 418 latches the state of VDD_IN_REGUL 470 to set the current limit value for C1 406. Comparator C1 monitors the current through primary winding 314 by measuring the voltage (FB 306–CS 305) across $R_{CS}$ 316, and compares this voltage (FB-CS) 422 to a preset limit signal LIMIT 424 or to ground. If a FWD signal 425 of DFF2 418 is HIGH, the positive input side of C1 406 is coupled to LIMIT 424. Otherwise, the positive input side of C1 406 is connected to ground. The state of FWD signal 425 depends on whether secondary output voltage $V_{DD}$ 319 is in regulation. FWD signal 425 of DFF2 418 is HIGH when secondary output voltage $V_{DD}$ 319 is below REF 430, or VDD_IN_REGUL 470 is LOW. FWD signal 425 of DFF2 418 is LOW if secondary output voltage $V_{DD}$ 319 is above REF 430, or VDD_IN_REGUL 470 is HIGH.

Continuing to refer to FIG. 5, switch logic circuitry 500 provides the necessary drive logic to switches $S_A$ 308 and $S_B$ 309. Switch logic circuitry 500 includes gates G3 407 through G7 402. Switch logic circuitry 500 ensures that both $S_A$ 308 and $S_B$ 309 are not on at the same time. If $S_A$ 308 is not on, $S_B$ 309 turns on upon detection of loss of regulation on secondary output voltage $V_{DD}$ 319. $S_B$ 309 is typically kept on only for a predetermined amount of time to minimize the voltage sag as shown in FIG. 3D at $V_{OUT}$ 318. Oscillators OSC 421 and OSC1 420 are timing signals provided for switch logic circuitry 500.

Voltage level FB 306 is coupled to main PWM controller 400 so that main PWM controller 400 can determine whether $V_{OUT}$ 318 is in regulation and provide appropriate signal level for VOUT_IN_REGUL 460. Main PWM controller 400 may include a comparator such as C3 900 in FIG. 4A to detect whether $V_{OUT}$ 318 is out of regulation. VOUT_IN_REGUL 460 is HIGH when $V_{OUT}$ 318 is in regulation, and VOUT_IN_REGUL 460 is LOW when $V_{OUT}$ 318 falls out of regulation. Main PWM controller 400 also provides input signals that control switches $S_A$ 308 and $S_B$ 309. When VOUT_IN_REGUL 460 is LOW, G6 410 turns on $S_A$ 308 to bring $V_{OUT}$ 318 into regulation, and $S_B$ 309 is off. Since PWM controllers are well known by those skilled in the art, a detailed discussion of main PWM controller 400 is not necessary.

Figure 6A:
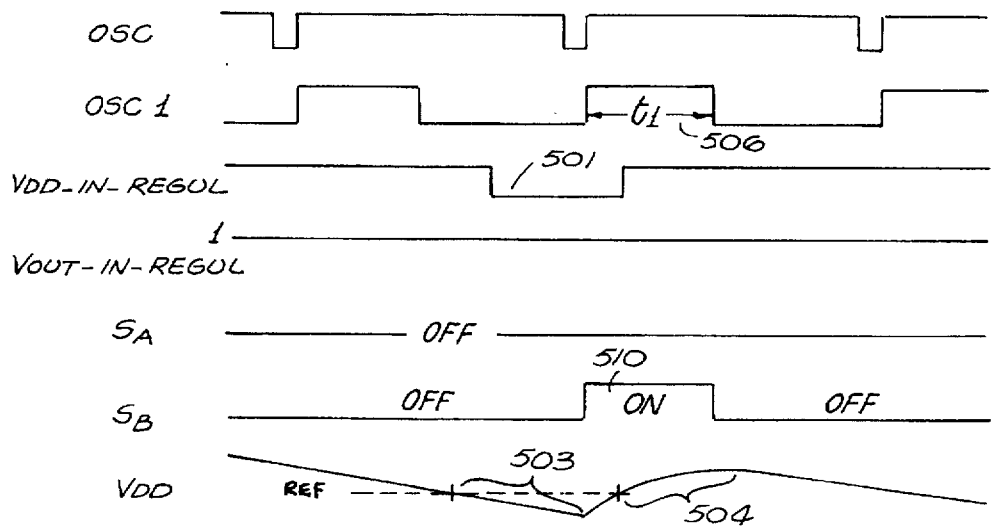
FIG. 6A is a timing diagram of the step-down switching regulator in FIG. 5 showing the operation of a secondary feedback loop that turns on a switch $S_B$ to regulate a secondary output voltage.

FIG. 6A shows a timing diagram of step-down switching regulator 301 shown in FIG. 5. Now referring to FIGS. 5 and 6A, in this example, primary output voltage $V_{OUT}$ 318 is in regulation so that VOUT_IN_REGUL 460 is set HIGH (logic 1). Secondary output voltage $V_{DD}$ 319 is also in regulation at the beginning of the cycle, or VDD_IN_REGUL 470 is HIGH. Both switches $S_A$ 308 and $S_B$ 309 are off initially. When there is a heavy load at secondary output node 342, $V_{DD}$ 319 droops below reference level (REF) 430, shown as a region 503 in FIG. 6A. As a result, VDD_IN_REGUL 470 goes LOW (logic 0), shown as a region 501.

Continuing to refer to FIGS. 5 and 6A, since VOUT_IN_REGUL 460 is HIGH and VDD_IN_REGUL 470 is LOW, AND gate G1 410 sends a logic 1 to an input D 450 of DFF1 408. DFF1 450 latches the input value on the rising edge of OSC 421, and switch $S_B$ 309 turns on (a region 510) to boost $V_{DD}$ 319, shown as a region 504. Switch $S_A$ 308 stays off. Switch $S_B$ 309 is kept on for a preset duration t1 506 to deliver a large enough pocket of charge to output capacitor $C_{DD}$ 322. Without the latching action of DFF1 408, $S_B$ 309 would have been turned off as soon as $V_{DD}$ 319 exceeds reference level (REF) 430. This would create many short pulses instead of few long pulses to deliver the same amount of power to secondary output node 342, again increasing switching losses and compromising efficiency.

Figure 6B:
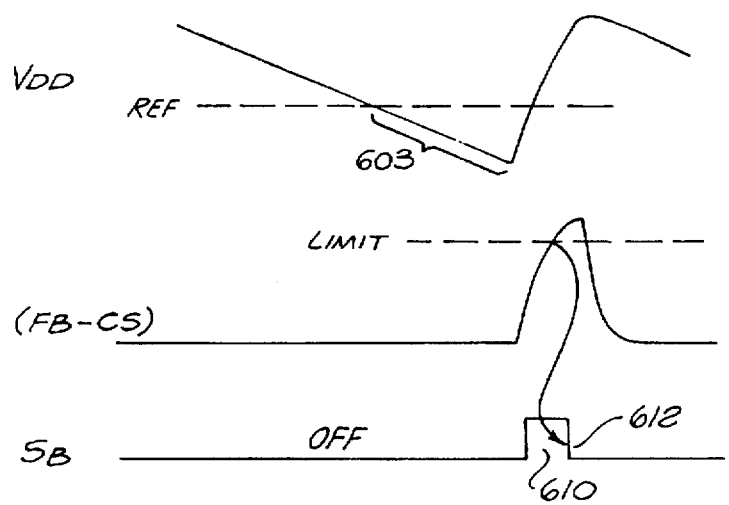
FIG. 6B is a timing diagram of a cycle that is terminated by the current limiting feature of the present invention.

FIG. 6B is a timing diagram of step-down switching regulator 301 shown in FIG. 5 in which excess current is demanded from output capacitor $C_{OUT}$ 320. Now referring to FIGS. 5 and 6B, the initiation of the cycle is similar to the case of FIG. 6A. VOUT_IN_REGUL 460 is HIGH, and both switches $S_A$ 308 and $S_B$ 309 are off initially. When $V_{DD}$ 319 droops below reference level (REF) 430, shown as a region 603, $S_B$ 309 turns on (a region 610) to boost $V_{DD}$ 319. Region 610 corresponds to region 510 in FIG. 6A. Up to this point, the operation in FIG. 6B is the same as the one in FIG. 6A. However, when the current through primary winding 314 exceeds the current limit value, a signal FB-CS 422, which is obtained by subtracting CS 305 from FB 306, will exceed LIMIT 424, and the output of comparator C1 406 goes LOW. When a reset $\overline{R}$ 451 senses LOW from the output of C1 406, flip-flop DFF1 408 resets, and an output Q 452 of DFF1 408 becomes LOW. As a result, $S_B$ 309 turns off, shown as a region 612. Accordingly, when excess current in primary winding 314 is detected, $S_B$ 309 turns off, minimizing the output voltage sag at $V_{OUT}$ 318.

Figure 6C:
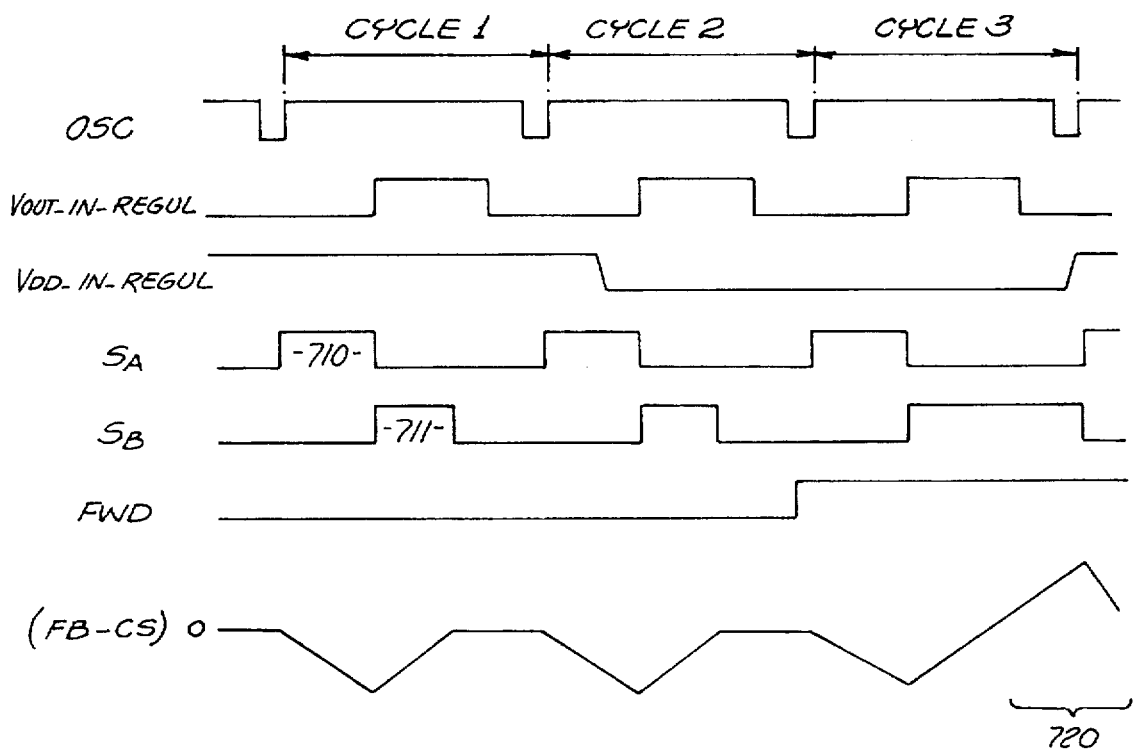

FIG. 6C is a timing diagram showing an operation where a primary output node 346 is loaded, and switch $S_A$ 308 is pulsed on in FIG. 5. Referring to FIGS. 5 and 6C, during cycles 1 and 2, step-down switching regulator delivers energy to both output nodes 346 and 342. At the beginning of cycle 1, the current through primary winding 314 is directed in a negative direction while $S_A$ 308 is on (a region 710), and the current through primary winding 314 becomes more negative until VOUT_IN_REGUL becomes HIGH (or $V_{OUT}$ 318 comes into regulation). The current through primary winding 314 can be viewed as (FB-CS) in FIG. 6C. When $V_{OUT}$ 318 is in regulation, $S_A$ 308 turns off and $S_B$ 309 turns on to deliver energy to $V_{DD}$ 319. When $S_B$ 309 turns on (a region 711), the current through primary winding 314 changes its direction and starts to become more positive. In cycle 1, $S_B$ 309 turns off when the current through primary winding 314 becomes zero.

When $S_A$ 308 is on, current flows through primary winding 313 to output node 346. When $S_A$ 308 is turned off by main PWM controller 400, and $S_B$ 309 is turned on, energy is delivered to output node 342. During these two cycles, the positive input side of comparator C1 406 is connected to ground because FWD 425 is LOW. Therefore, as soon as the current through $R_{CS}$ 316 reaches zero, or FB-CS 422 becomes zero, the output of C1 406 becomes LOW, DIFF 1 408 resets, and $S_B$ 309 is turned off. When $V_{DD}$ 319 goes out of regulation, or VDD_IN_REGUL is LOW, a logic 1 (HIGH) is latched into DFF2 418, and FWD 425 becomes HI, as in cycle 3.

Continuing to refer to FIGS. 5 and 6C, the first portion of cycle 3 is identical to cycles 2 and 3 where $S_A$ 308 is on. However, because FWD 425 is HI, the positive side of comparator C1 406 is coupled to LIMIT 424. Since FB-CS 422 is less than LIMIT 424, $S_B$ 309 does not turn off when the current through primary winding 314 becomes zero, but instead $S_B$ 309 stays on until cycle 3 ends. Extra energy is, thus, delivered to $V_{DD}$ 319. A region 720 in FIG. 6C indicates that extra energy on FB-CS 422.

FIG. 7 presents a step-down switching regulator 971 with multiple secondary outputs. Step-down switching regulator 971 has one primary winding 984 and three secondary windings 981, 982 and 983. An inductor current sense resistor $R_{CS}$ 816 is provided to sense the current in primary winding 984. Nodes FB 976 and CS 975 are coupled to control circuitry A 1030 in a similar manner as those shown in FIGS. 4B and 5. Each of secondary windings 981, 982 and 983 is coupled to a rectifier, a secondary output node, a secondary capacitor and a comparator. A secondary output voltage may be positive like $V_{DD1}$ 994 or $V_{DD3}$ 996 or may be negative like $V_{SS2}$ 995. Accordingly, $V_{REF1}$ 1001 and $V_{REF3}$ 1003 are positive, and $V_{DD1}$ 994 or $V_{DD3}$ 996 falls out of regulation if $V_{DD1}$ 994 or $V_{DD3}$ 996 becomes less than $V_{REF1}$ 1001 or $V_{REF3}$ 1003, respectively. On the other hand, $V_{REF2}$ 1002 is negative, and $V_{SS1}$ 995 falls out of regulation if $V_{SS1}$ 995 becomes greater than $V_{REF2}$ 1002.

Continuing to refer to FIG. 7, an And gate 1015 is used to combine comparators C21 1011, C22 1012 and C23 1013. When any of $V_{DD1}$ 994, $V_{SS1}$ 995 and $V_{DD3}$ 996 is out of regulation, a VDD_IN_REGUL signal 1017 becomes LOW, and power is delivered to the secondary output nodes using any of the two schemes described above in accordance with the present invention. To regulate multiple secondary outputs, a control circuit similar to control circuitry 300 in FIG. 5 or control circuitry 800 in FIG. 4A can be used except that C2 940 in FIG. 4B or C2 436 in FIG. 5 will be replaced with a comparator logic 1020 of FIG. 7.

It should be noted that each of the step-down switching regulators described according to the present invention in FIGS. 4A and 5 has a positive input voltage and a positive output voltage. Those skilled in the art can easily extend the present invention to inverse voltages. For example, $V_{SS1}$ 995 in FIG. 7 is a negative output voltage.

While the present invention has been particularly described with reference to FIGS. 1 through 7, it should be understood that the figures are for illustration only and should not be taken as limiting the scope of the invention. Many changes and modifications may be made to the invention, by one of ordinary skill in the art, without departing from the spirit and scope of the invention as disclosed herein.

We claim:

1. A method of operating a switching regulator having a transformer with a primary and at least one secondary winding and having a first regulator output coupled to one end of the primary winding and a second regulator output coupled to the secondary winding, a second end of the primary winding being coupled to first and second switches for controllably coupling the second end of the primary winding to a first supply voltage and to a second supply voltage, respectively, comprising the steps of:

(a) controlling the first and second switches to provide an average current through the primary of the transformer to maintain the first regulator output in regulation; and, (b) controlling the first and second switches to provide time rates of change of current through the primary of the transformer to maintain the second regulator output in regulation.

2. The method of claim 1 wherein when the second regulator output begins to loose regulation, step (b) comprises the step of turning on the first switch followed by the turning off of the first switch and turning on the second switch followed by turning off the second switch, successively as required to maintain regulation of the second regulator output.

3. The method of claim 1 wherein when the first regulator output begins to loose regulation, step (a) comprises the step of turning on the first switch followed by the turning off of the first switch and turning on the second switch followed by turning off the second switch, successively as required to maintain regulation of the second regulator output; and wherein when the second regulator output begins to loose regulation, step (b) comprises the step of turning on the first switch followed by the turning off of the first switch and turning on the second switch followed by turning off the second switch, successively as required to maintain regulation of the second regulator output.

4. The method of claim 1 wherein when the second regulator output begins to loose regulation, step (b) comprises the step of turning on the second switch followed by turning off the second switch, successively as required to maintain regulation of the second regulator output.

5. The method of claim 1 wherein when the first regulator output begins to loose regulation, step (a) comprises the step of turning on the first switch followed by the turning off of the first switch and turning on the second switch followed by turning off the second switch, successively as required to maintain regulation of the second regulator output; and wherein when the second regulator output begins to loose regulation, step (b) comprises the step of turning on the second switch followed by turning off the second switch, successively as required to maintain regulation of the second regulator output.

6. A step-down switching regulator comprising:

a transformer with a primary and at least one secondary winding and having a first regulator output coupled to a first end of the primary winding having first and second ends, and a second regulator output coupled to the secondary winding;

the second end of the primary winding being coupled to first and second switches for controllably coupling the second end of the primary winding to a first supply voltage and to a second supply voltage, respectively; and, a controller controlling the switches to provide currents through the primary of the transformer to maintain the first regulator output above a first predetermined voltage, and to provide time rates of change of currents through the primary of the transformer to maintain the second regulator output above a second predetermined voltage.

7. The step-down switching regulator of claim 6 wherein when the second regulator output begins to loose regulation, the controller turns on the first switch, then turns off the first switch and turns on the second switch, then turns off the second switch, successively as required to maintain regulation of the second regulator output.

8. The step-down switching regulator of claim 6 wherein when the first regulator output begins to loose regulation, the controller turns on the first switch, then turns off the first switch and turns on the second switch, then turns off the second switch, successively as required to maintain regulation of the second regulator output; and wherein when the second regulator output begins to loose regulation, the controller turns on the first switch, then turns off the first switch and turn on the second switch, then turns off the second switch, successively as required to maintain regulation of the second regulator output.

9. The step-down switching regulator of claim 6 wherein when the second regulator output begins to loose regulation, the controller turns on the second switch, then turns off the second switch, successively as required to maintain regulation of the second regulator output.

10. The step-down switching regulator of claim 6 wherein when the first regulator output begins to loose regulation, the controller turns on the first switch, then turns off the first switch and turns on the second switch, then turns off the second switch, successively as required to maintain regulation of the second regulator output; and wherein when the second regulator output begins to loose regulation, the controller turns on the second switch, then turns off the second switch, successively as required to maintain regulation of the second regulator output.

* * * * *